May 9, 1950  G. G. SCHNEIDER  2,507,186
PIECE HANDLING MACHINE FOR DELIVERING
THIN PIECES OF MATERIAL
Filed Jan. 31, 1945
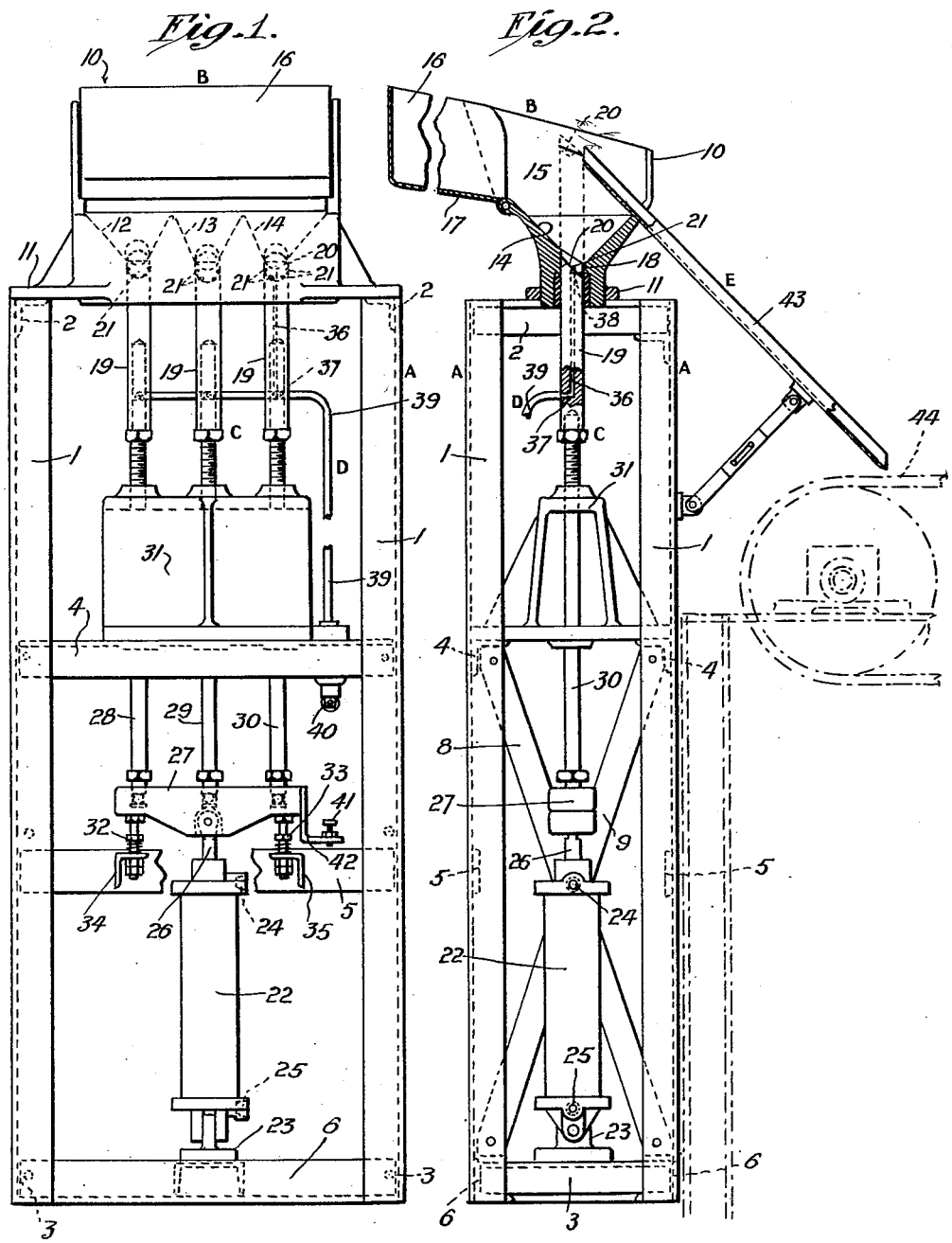
INVENTOR
Gerhard Gunther Schneider
BY
ATTORNEY Patented May 9, 1950

2,507,186

UNITED STATES PATENT OFFICE 2,507,186

PIECE HANDLING MACHINE FOR DELIVERING THIN PIECES OF MATERIAL

Gerhard Gunther Schneider, Maplewood, N. J., assignor to National Union Radio Corporation, Newark, N. J., a corporation of Delaware Application January 31, 1945, Serial No. 575,526

6 Claims. (Cl. 222—9)

In the manufacture of radio vacuum tubes, formed or stamped pieces of mica are used for insulation. In various operations, it is necessary to lay such pieces of mica individually and in a particular relation. One such operation is that in which the surfaces of the mica pieces are coated. Heretofore, and prior to the invention herein disclosed, it has been the common practice to lay the pieces manually for the purpose of coating the surface thereof. This practice has prevailed in feeding pieces on to the conveyor belt of the coating machine disclosed in the copending application, Serial No. 561,592, filed November 2, 1944, now Patent No. 2,470,580. Several operators are required for this purpose and, in general, there is overlapping of pieces and the machine is loaded only to about three-quarters of its capacity.

An object of the present invention is to provide a machine that is suitable for segregating individual pieces of thin material such, for example, as the mica pieces referred to, and for delivering such pieces individually and consecutively. Another object of the invention is to provide a machine for automatically feeding such pieces to a conveyor belt.

The foregoing objects and certain advantages that will hereinafter appear are realized in the embodiment of the invention illustrated in the accompanying drawing and described in detail below, from which description a clearer understanding of the invention may be had.

The drawings include:

Fig. 1 which is a rear elevation of a machine embodying the invention; and

Fig. 2 which is a side elevation of the same, partly in section.

The particular machine illustrated in the drawings is designed to deliver to a conveyor belt in proper succession three pieces of mica arranged side by side and spaced apart. In all essential respects, this machine is the same as one which delivers single pieces of mica in proper succession. The operative parts are duplicated for each additional piece to be delivered and the whole is arranged on a common frame.

In general, the machine illustrated in the drawings includes a frame support on which the various operative parts are mounted, which support is designated generally by the character A; means for holding a quantity of pieces of mica, which means are designated generally by the character B; segregating means, designated generally by the character C, for segregating single pieces from the quantity held by the holding means; an arrangement for removing a piece separated by the segregating means, designated generally by the character D; and delivery means, designated generally by the character E. A quantity of mica pieces are poured into the holding means of the machine without regard to their relative relation. The segregating means operates periodically to segregate a piece from the pieces in the holding means and carries the piece into proper position with respect to the delivery means. At this point, the removing means actuates to remove the segregated piece and deposit it on the delivery means from whence it passes to a conveyor belt, for example.

In the machine illustrated, the frame is constructed of angle irons and provides a vertical, box-like frame structure. Four uprights or standards 1 constitute the corners of the frame. These are secured together into a rigid structure by upper and lower side, cross pieces 2 and 3, and upper, intermediate and lower front and rear cross pieces 4, 5 and 6 respectively. Side trusses in the form of crossed members 8 and 9 serve to strengthen the frame.

The mica holding means is secured to the upper end of the frame. This consists of a trough-shaped hopper 10 having a base 11 resting upon and secured to the upper end of the frame. The hopper, in the machine illustrated, includes three funnel-shaped portions 12, 13 and 14, one for each segregating means, which receive mica pieces from the common portion of the hopper, the portion 15, above the funnel-shaped portions. Desirably, an auxiliary hopper 16 is provided to increase the capacity of the machine. The auxiliary hopper is open along one edge thereof and the bottom 17 is pivoted to the wall of the main hopper at the open edge. The auxiliary hopper fits within the side walls of the main hopper and may be secured in any adjusted position about its pivoted connection with the hopper 10. Desirably, the auxiliary hopper is set, in accordance with the angle of repose of the mica pieces, to effect a feeding therefrom to the main hopper 10 by the action of gravity.

The base of the main hopper is bored at the bottom of each funnel-shaped portion to form openings therethrough, such as the opening 18 (Fig. 2) from the bottom of the funnel-shaped portion 14. Into the opening 18, the upper end of a segregating plunger 19 extends and the plunger is slidably mounted in the opening. The upper face 20 of the plunger is inclined to the axis of the plunger and may be cut away as at 21 forming an inclined elliptical sector. Extending from the lower portion of the edge of the face of the plunger, there are a series of spaced pins or projections 21 which engage the edge of a piece of mica resting flat on the face of the plunger. The inclination of the face of the plunger is such that a piece of mica resting thereon will slide down the face to be engaged by the pins or projections 21 which retain the piece of mica as the plunger moves up through the hopper. The pins extend from the face of the plunger a distance such that only one piece of mica can be retained on the face of the plunger.

The plunger is reciprocated so that it moves through the hopper from the position (Fig. 2) shown in full lines to the position shown in broken lines. Reciprocation of the plunger is desirably effected either pneumatically or hydraulically. For this purpose, there is provided a cylinder 22, one end of which, the lower end, is pivotally secured to a bracket 23 mounted on and secured to the lower end of the frame. The cylinder is provided with ports 24 and 25 at each end thereof for the admission and exhaust of fluid under pressure. Within the cylinder, there is a piston (not shown) which is connected to a piston rod 26 that extends through and is slidably mounted in the upper head of the cylinder. The upper end of the piston rod is pivotally secured to a cross beam 27. From the cross beam, rods 28, 29 and 30 extend and each is secured at its upper end to a segregating plunger, the rod 30 being secured to the plunger 19. These rods pass through spaced openings in a bracket 31 and are thus restrained in axial alignment with the plungers. The pivotal mounting of the cylinder and the cross beam 27 serves to equalize the thrust on the three plungers. Adjustable stops 32 and 33 are mounted on brackets 34 and 35 and serve to limit the downstroke of the plungers. Fluid under pressure controlled through a cam operated four way valve, actuated by the machine being fed, serves to effect periodic reciprocation of the plungers.

When a plunger moves through the mica pieces in the hopper, it segregates a single piece of mica which rests on the inclined face thereof. An air jet is utilized to remove the piece of mica from the face of the plunger. To this end, a passage 36 extending axially of the plunger 19 is provided. At the lower end, the passage 36 communicates with a transverse passage 37 through the side wall of the plunger, and at the upper end with a jet passage 38 through the face of the plunger. The passage 37 is connected by a flexible tube 39 to one side of a valve 40 that is mounted below the bracket 31. The other side of the valve 40 is connected to a source of air under pressure. This valve is of the type in which pressure on the stem opens the valve and spring pressure closes the valve.

At the end of the upward stroke of the piston, the valve 40 is opened and air under pressure blows the piece of mica off of the face of the plunger. Opening of the valve is effected by an adjustable set screw 41 threaded in an L-shaped bracket 42 secured to the cross beam 27. The set screw is in line with the valve stem and in the upper position of the cross beam opens the valve.

In the upper position of the plunger 19, the face 20 thereof is slightly above and adjacent to the base of a delivery chute 43. The delivery chute extends through the side wall of the hopper, is inclined downwardly, and the lower end is above a conveyor belt 44. The pieces slide down the chute and on to the conveyor belt. Desirably, there is a separate chute for each segregating plunger. In this way the several pieces are delivered to the conveyor belt properly spaced apart. The mechanism of the machine containing the conveyor belt operates the four way valve to secure periodic reciprocation of the segregating plungers.

The pins 21 on the plunger 19 are removable and replaceable with other pins that project above the surface of the plunger different amounts. Thus, different pin lengths are used for mica pieces of different thicknesses. It has been found that the friction between a pin and an opening therefor is sufficient to retain the pin on the plunger and thus the pins are readily removed and replaced. In addition, pins are provided at different places for different shaped pieces and the removability of the pins permits a ready change to be made for different shaped pieces.

From the foregoing description of the embodiment of the invention illustrated in the drawing and described in detail above, it will be apparent that by the invention there is provided a mechanism for segregating and delivering thin sheet pieces such as pieces of mica, a machine that is suitable for feeding pieces of mica consecutively and in spaced relation to a conveyor belt, and that is simple in construction and reliable in operation.

It will be obvious that various changes may be made by those skilled in the art in the details of the embodiment of the invention illustrated in the drawing and described above within the principle and scope of the invention as expressed in the appended claims.

I claim:

1. A machine of the kind described for delivering relatively thin pieces such as pieces of mica and the like, which machine comprises in combination a trough container for holding a plurality of pieces, a vertically reciprocable plunger movable centrally of said container and having a substantially flat downwardly inclined upper end for segregating a single piece from the plurality of pieces in said holding means as a result of said plunger moving through said trough, means for positively removing a piece from said segregating means, and at least one projection on said inclined upper end of the plunger for holding said segregated piece from sliding off said inclined end until it is positively removed by said removing means.

2. A machine of the kind described for delivering relatively thin pieces such as pieces of mica and the like, which machine comprises in combination means for holding a plurality of pieces, a vertically reciprocable plunger for segregating a single piece from the plurality of pieces in said holding means, air jet means for positively removing a piece from said segregating means, means carried by the upper end of said plunger for holding the segregated piece from sliding off the end of said plunger until it is removed by said air jet means, and means for delivering a piece removed from said segregating means.

3. A machine of the kind described for delivering relatively thin pieces such as pieces of mica and the like, which machine comprises in combination a container for holding a plurality of pieces, a vertically reciprocable plunger for successively segregating single pieces from the pieces in the container, said plunger having an inclined upper end to receive said segregated piece, means for positively removing a piece from said segregating means, and said inclined upper end of the plunger having at least one projection for holding the segregated piece from sliding off by gravity except when it is removed by said removing means.

4. A machine of the kind described for delivering relatively thin pieces such as pieces of mica and the like, which machine comprises in combination means for holding a plurality of pieces, means for segregating a single piece from the plurality of pieces in said holding means including a plunger extending into and slidably mounted in said holding means, means for effecting relative movement between the plunger and said holding means, air jet means for positively removing a piece from said segregating plunger, and means carried by the upper end of said plunger for restraining said segregated piece from sliding off by gravity until it is removed by said air jet means.

5. A machine of the kind described for delivering relatively thin pieces such as pieces of mica and the like, which machine comprises in combination means for holding a plurality of pieces, means for segregating a single piece from the plurality of pieces in said holding means including a vertically reciprocable plunger extending into and slidably mounted in said holding means, the plunger having an end surface inclined to the axis thereof, means for effecting relative reciprocatory movement between the plunger and said holding means, means for positively removing a piece from the inclined surface of said segregating plunger, and a plurality of pins carried by the inclined surface of said plunger to hold said segregated piece against sliding off the plunger by gravity until it is removed by said removing means.

6. A machine of the kind described for delivering relatively thin pieces such as pieces of mica and the like, which machine comprises in combination means for holding a plurality of pieces, means for segregating a single piece from the plurality of pieces in said holding means, and means for removing a piece from said segregating means including an air jet.

GERHARD GUNTHER SCHNEIDER.

REFERENCES CITED

The following references are of record in the file of this patent:

UNITED STATES PATENTS

| Number | Name | Date |
|---|---|---|
| 1,370,511 | Boercker | Mar. 8, 1921 |